United States Patent [19]

Hills

[11] Patent Number: 4,609,579
[45] Date of Patent: Sep. 2, 1986

[54] METHOD AND APPARATUS FOR APPLYING STRETCHABLE, PROTECTIVE WRAP

[75] Inventor: Gary G. Hills, Austin, Tex.
[73] Assignee: Teltronics, Inc., Austin, Tex.
[21] Appl. No.: 750,890
[22] Filed: Jul. 1, 1985
[51] Int. Cl.$^4$ ............................................. B32B 27/14
[52] U.S. Cl. ...................................... 428/195; 428/36; 428/207
[58] Field of Search ................. 428/200, 195, 36, 905, 428/207

[56] References Cited

U.S. PATENT DOCUMENTS 4,465,717 8/1984 Crofts et al. ..................... 428/200 X
4,528,226 7/1985 Sweeny ............................ 428/905 X Primary Examiner—Thomas J. Herbert
Attorney, Agent, or Firm—Arnold, White & Durkee

[57] ABSTRACT

A self-adherent, stretchable, resilient pressure wrapping tape and method of application for compressingly protecting a wire splice or the like, the tape having a gauge incorporated therein for indicating the amount of stretch of the tape. The tape is stretchingly wrapped around the wire splice and has a tensile strength and resilient memory to compressingly engage the wire splice. It is necessary to stretch the tape a certain amount to apply the correct amount of compression; therefore, a gauge is included which indicates the amount of stretch of the tape. The gauge includes a plurality of longitudinally spaced impressions printed on the tape which have a certain visual appearance with the tape unstretched, and another visual appearance when the tape is stretched to the correct amount for the desired compression. For example, the impression may appear as a rectangle with illegible lettering with the tape unstretched, but with the tape stretched correctly the impression appears as a square with legible lettering.

16 Claims, 4 Drawing Figures

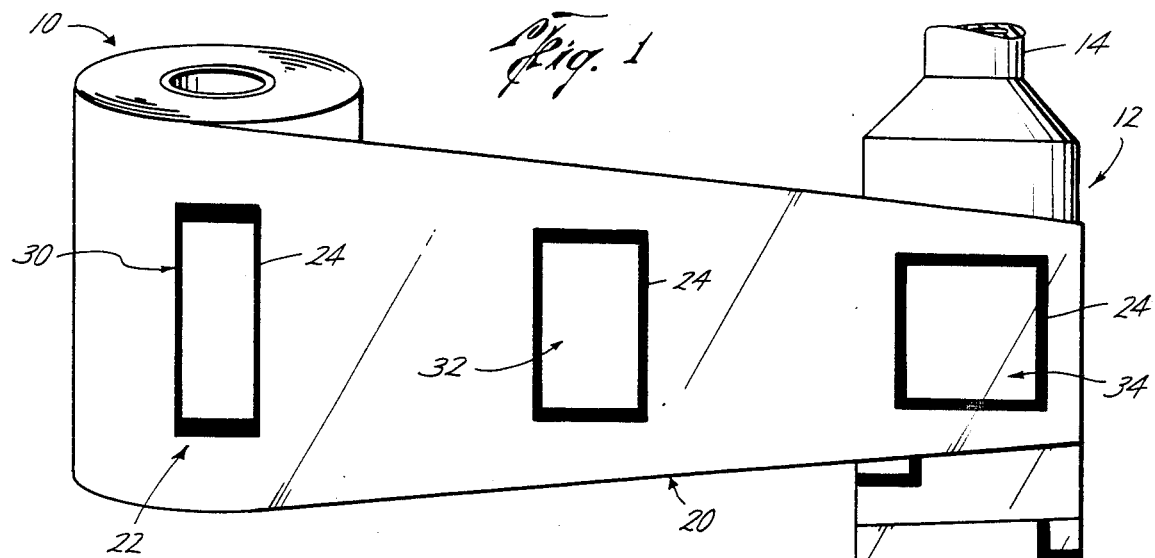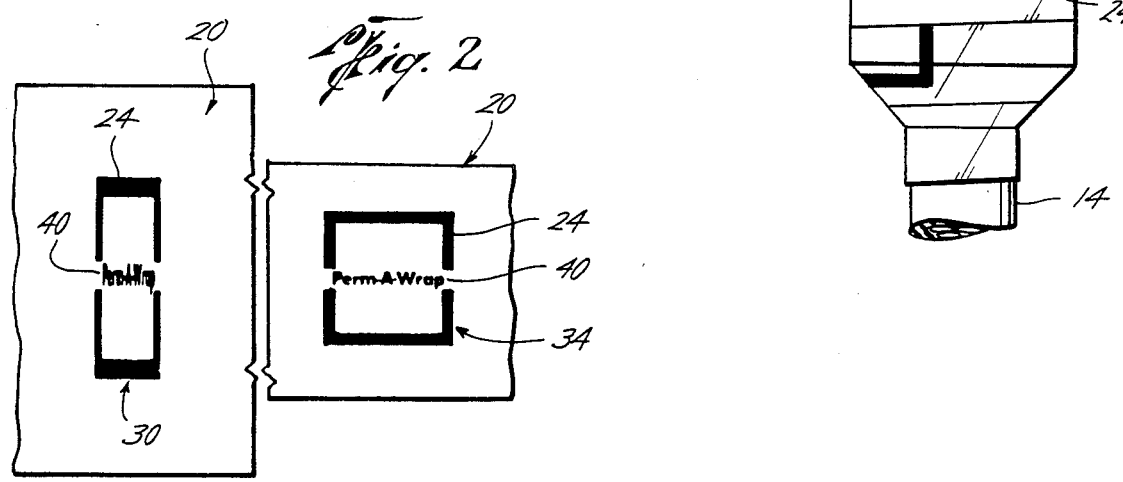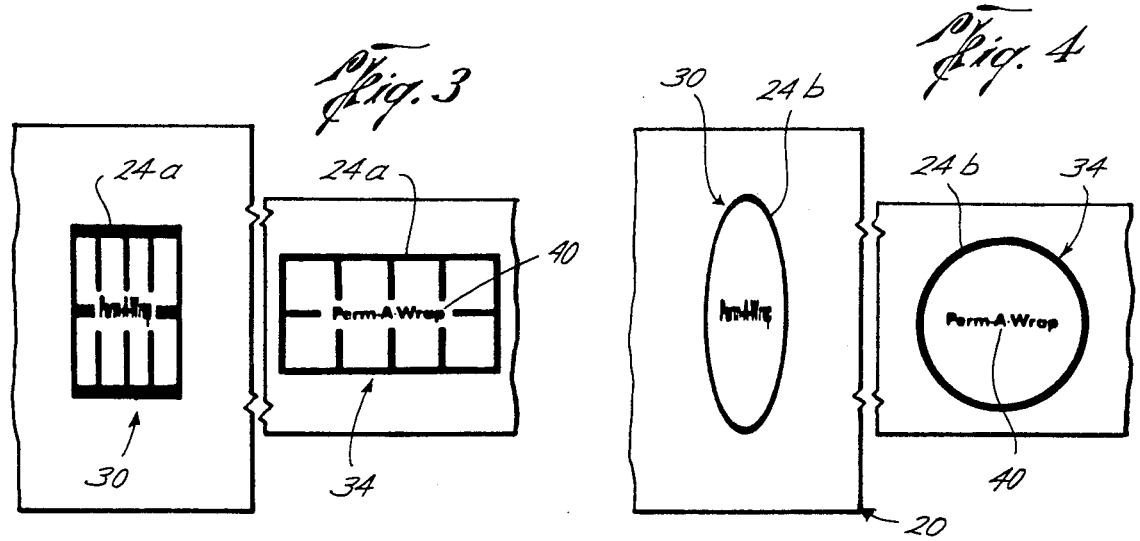

METHOD AND APPARATUS FOR APPLYING STRETCHABLE, PROTECTIVE WRAP

BACKGROUND OF THE INVENTION

1. Field of the Invention

This invention relates to a stretchable, resilient pressure wrapping tape and method of application, the wrapping tape includes a gauge which indicates the amount of stretch of the tape applied during application. More particularly, the gauge includes a plurality of impressions printed upon the tape which assume a first appearance with the tape unstretched and a second appearance when the tape is stretched the proper amount for the desired application.

2. Description of the Prior Art

In both the utility and communication industries it is often necessary to form a splice between the distal ends of two wires. Such a splice might be formed by a simple twisted connection between two single strand wires, or the wire splice may incorporate a modular connector which joins the distal ends of multi-stranded wires, such as 25 pair communication wire. In any event, methods and apparatus are well known for operatively connecting the ends of two wires to form an effective splice.

When such a splice is formed, it is important that the splice and surrounding wire be protected from deterioration. Where the wire and splice is buried, such deterioration might result from moisture or the sometimes the caustic environment of the surrounding earth. In aerial applications, such deterioration may result from moisture collecting in the splice and inside the wire insulation surrounding the strands. In either event, if the deterioration is not combated, splice failure is the inevitable result.

In a recent development, a specialized type of protective pressure tape has been devised which when wrapped around such a splice and the adjoining wire significantly reduces the effects of deterioration. Generally speaking, the pressure tape is clear and self-adherent and is made from a plasticized polyvinyl chloride material. Preferably, such a tape has a tensile strength and resiliency such that the tape can be stretched at least 100% while retaining a large portion of its resiliency and tensile strength. In the context of the present application, "resiliency" is taken as meaning the tendency to resume its original shape when stretched.

Typically, such pressure wrapping tape is used in conjunction with a protective modular connector and other methods of protecting the splice from deterioration. In this case, the tape is normally applied as a final step in protecting the wire splice. The tape is stretchingly wrapped around the wire splice in a spiral or overlapping relation. Particularly in aerial applications where moisture has a tendency to collect inside the insulating sheathing, the pressure tape is wrapped not only around the wire splice but also around a portion of the adjoining wire. The compression induced by the pressure tape tends to dispel any pockets or voids in the splice and surrounding wire which might serve as collection points for moisture.

Because of the importance of correctly applying such pressure wrapping tape around a wire splice and the adjoining wire, exact specifications have been devised for the amount of compression to be developed by the pressure tape. If a splice fails, the failed splice is carefully examined to determine whether or not the proper specifications were followed during installation. The amount of compression developed by the pressure tape is a function of many factors, but of critical importance is the amount of elongation or stretch imparted to the tape during the wrapping of the wire.

Particularly in field conditions, it is difficult to effectively judge the amount of longitudinal stretch applied to the tape during the wrapping process. However, small differences in the amount of stretch can result in large differences in the amount of compressive force developed. If the amount of stretch is too small, the desired amount of compressive force is not developed and the wire splice and surrounding wire is not adequately protected. If the amount of stretch is too great, the tensile strength of the tape may be exceeded (breaking the tape), or the resilient properties of the tape can be diminished, whereupon the tape does not develop the desired amount of compressive force. Thus, it would be a significant advance in the art if an improved pressure tape were devised which incorporated a mechanism for ascertaining when the proper amount of stretch or elongation is applied to the tape during field installation.

SUMMARY OF THE INVENTION

The present method and apparatus generally solves the problems outlined above associated with past attempts to protect a wire splice from deterioration. That is, the pressure wrap hereof includes an elongated, thin, tape which is stretchable and resilient to impart a compressive force to the wire when the tape is stretchingly wrapped around the wire. The tape includes a gauge means which indicates the amount of stretch (i.e. "elongation") imparted to the tape such that the tape can be properly applied, even in field conditions. Preferably, the tape retains most of its resilient properties when stretched to around twice its unstretched elongation. Further, the tape is self-adherent for easily wrapping the tape around the wire.

The gauge means includes a plurality of impressions longitudinally spaced along the tape. The impressions are preferably printed on the tape and are designed such that a particular impression presents a first appearance with the tape in an unstretched condition, and a second appearance with the tape longitudinally stretched in the region of the impression. The impressions are developed such that the second appearance correlates to a certain amount of tape elongation which yields the desired compression when the tape is wrapped around the wire. In a preferred form, the first appearance of the impression is generally rectangular and the second appearance of the impression is generally square. Further, the impression preferably includes letters which are generally illegible when the tape is unstretched, but become legible when the tape is stretched to the desired elongation. In an alternative embodiment, the impression appears as an oval with the tape unstretched, and appears as a circle when the tape is stretched. In a further embodiment, the impression is generally rectangular in appearance with a plurality of smaller rectangles therein and oriented generally transversely to the tape when the tape is unstretched; when the tape is stretched the impression appears as a rectangle longitudinally oriented to the tape having a plurality of squares therein.

In the method of application of the present invention, a segment of the tape is coupled to the wire. Another segment of the tape is then stretched until the gauge means indicates that a certain amount of stretch has been achieved. The stretched segment is circumferentially wrapped around the wire to apply the compressive force to the wire. As can be appreciated, utilizing the method and pressure wrap of the present invention allows a workman in the field to correctly apply the pressure tape to effectively protect the wire splice.

BRIEF DESCRIPTION OF THE DRAWINGS

FIG. 1 is a fragmentary, perspective view of the pressure wrap of the present invention being applied to protect a wire splice;

FIG. 2 is a fragmentary, plan view of a portion of the wrap of the present invention showing the preferred impression;

FIG. 3 is a fragmentary, plan view similar to FIG. 2 showing an alternative embodiment of the impression hereof; and FIG. 4 is a fragmentary, plan view of another embodiment of the impression of the present invention.

DESCRIPTION OF THE PREFERRED EMBODIMENT

Turning now to the drawings, a wrap 10 is illustrated as it is applied in compressive, protective relation over a wire splice 12 joining the distal ends of wires 14. The wire splice 12 is formed using conventional devices and methods, such as a simple twist connection or utilizing a modular connector for joining multi-stranded wires.

In more detail, the wrap 10 comprises a selfadherent, stretchable, resilient tape 20 which is preferably clear and comprised of a plasticized polyvinyl chloride material. The tape is approximately 4 inches in width and about 0.003 inches in thickness. The tape 20 is preferably a single layer, but can comprise two laminated layers of equal thickness. The physical properties of the tape are such that the tape can be stretched to approximately twice its normal length while retaining a portion of its tensile strength and a portion of its resiliency. Thus, when stretched to around twice its normal length, the tape retains a resilient memory. Although the tensile strength and resiliency of the tape varies with temperature and aging, nevertheless, the tape retains at least some tensile strength and resiliency at normally encountered field temperatures and conditions. That is, the tape of the preferred embodiment can be elongated at least 100% at minus 18° C. and 200% at 23° C. Further, after aging 24 hours at 55° C. and 100% elongation, the tape retains at least 150 psi tensile strength.

The wrap 10 further includes a gauge means 22 for indicating the amount of elongation of the tape 20. Preferably, the gauge means 22 comprises a plurality of longitudinally spaced impressions 24 printed on the tape 20. The visual appearance of the impressions 24 changes when the tape 20 is elongated or is stretched.

Turning to FIG. 1, the impression 24 exhibits a visual appearance as at 30 with the tape in an unstretched condition. The impression 24 displays another visual appearance as at 32 when an intermediate amount of stretch or elongation is applied to the tape 20. Finally, the impression 24 exhibits a particular appearance as at 34 when a certain amount of stretch is applied to the tape 20. The appearance 34 is formulated such that it is achieved when the desired amount of stretch is attained corresponding to the amount of compressive force desired.

FIG. 2 illustrates a comparison of different segments of the tape 20, with the left hand portion illustrating the tape 20 in an unstretched condition; the right hand portion illustrating the tape 20 when stretched to the proper amount. As can be seen in FIG. 2, the left hand impressions 24 presents the unstretched appearance 30, while the right hand impression 24 presents the particular appearance 34 when the desired amount of stretch is attained. Further, the impression 24 includes lettering thereon as at 40. As can be seen in FIG. 2, the lettering is generally illegible when the tape 20 is unstretched (left hand portion of FIG. 2). In comparison, the lettering 40 is legible and reads "Perm-A-Wrap" when the tape 20 is stretched the proper amount. As can be appreciated from FIG. 2, the unstretched appearance 30 of the impression 24 is generally in the shape of a rectangle transversely oriented to the tape, while the appearance 34 of the impression 24 is generally in the shape of a square when the tape 20 stretched to the desired amount.

FIG. 3 illustrates an alternative embodiment of the impressions 24a, with the left hand portion illustrating the unstretched appearance 30 of the impression 24a, while the right hand portion of FIG. 3 illustrates the stretched appearance 34 of the impression 4. In the alternative embodiment of FIG. 3, the impression 24a of the appearance 30 comprises a rectangle generally transversely oriented to the tape 20 and having a plurality of similarly oriented rectangles therein. In contrast, the appearance 34 of the impression 24a presents a rectangle longitudinally oriented to the tape 20, and includes a plurality of squares therein. Lettering 40 is similarly included in the impressions 24a of FIG. 3.

FIG. 4 illustrates still another embodiment of the impressions 24b, with the left hand portion illustrating the unstretched appearance 30 of the impression 24b, while the right hand portion illustrates the stretched appearance 34. As can be seen in FIG. 4, the unstretched appearance 30 is generally ovular, while the stretched appearance 34 appears as a circle. The impressions 24b as illustrated in FIG. 4, similarly incorporate the lettering 40.

In use, the wrap 10 of the present invention is applied to protect the wire splice 12 from the adverse affects of deterioration. Turning to FIG. 1, it is generally seen that the free end of the tape 20 is first secured to the wire 14 or wire splice 12 with the remainder of the tape 20 then stretchingly wrapped in overlapping spiral relation about the splice 12. In more detail, with a segment of the tape 20 coupled to the wire splice 12 or wire 14, the longitudinally adjacent, uncoupled segment of the tape is then stretched until the gauge means 22 indicates the desired amount of stretch. That is, the tape 20 is longitudinally stretched (right to left in FIG. 1) until the impression 24 in the region of the stretch gives the desired appearance 34. The stretched segment of the tape 20 is then circumferentially wrapped such that when the tape 20 is in place, the desired compressive force is applied.

Although described as a series of discrete steps, one skilled in the art will appreciate that the method of applying the wrap 10 to a splice 12 is an integrated, continuous process wherein the workman simultaneously unrolls the tape 20, circumferentially wraps the splice, and applies longitudinal stretch to the tape. The result is a wire splice 12, and a portion of the wires 14 adjoining the splice 12, which have a pressure wrap 10 applied. The pressure wrap 10 continuously compresses the wires 14 and splice 12 to eliminate the possibility of moisture collection and attendant deterioration.

As illustrated in FIG. 2, the preferred impression 24 assumes the appearance 34 of a square when the desired amount of elongation or stretch is achieved. FIGS. 3 and 4 illustrate alternative forms for the impression 24; however, it will be appreciated that different types of geometric shapes and lettering 40 can be employed without detracting from the scope of the present invention.

What is claimed is:

1. A wrap for compressing a wire or the like, comprising:
    an elongated, thin, tape adapted for wrapping around the wire, the tape being longitudinally stretchable and resilient to impart a compressive force to the wire when the tape is stretchingly wrapped around the wire; and
    gauge means comprising an impression printed on the tape for indicating the amount of longitudinal stretch of the tape, the gauge means presenting a generally distorted visual appearance in the unstretched condition and a generally undistorted visual appearance when stretched a desired longitudinal amount.

2. The wrap according to claim 1, the tape being adherent for engaging the wire or other portions of the tape.

3. The wrap according to claim 1, wherein the tape is longitudinally stretchable to around twice its unstretched elongation.

4. The wrap according to claim 1, wherein the tape retains a portion of its resilient properties for substantial periods of time when stretched to around twice its unstretched elongation.

5. The wrap according to claim 1, wherein the tape retains at least around 150 psi tensile strength when stretched to twice its unstretched elongation.

6. The wrap according to claim 1, the gauge means comprising a plurality of impressions longitudinally spaced along the tape.

7. The wrap according to claim 1, said first appearance of the impression being rectangular and said second appearance of the impression being generally square.

8. The wrap according to claim 1, said first appearance of the impression being ovular and said second appearance of the impression being generally circular.

9. The wrap according to claim 1, said first appearance of the impression being rectangular with a plurality of smaller rectangles therein, the elongated orientation of the first rectangular appearance being transverse to the tape, said second appearance of the impression being rectangular, the elongated orientation thereof being longitudinal to the tape and having a plurality of squares disposed therein.

10. The wrap according to claim 1, said first appearance of the impression including a plurality of generally illegible letters and said second appearance of the impression including a plurality of generally legible letters.

11. In a stretchable, resilient, self-adherent tape which applies a compressive force when stretchingly wrapped around a wire or the like, the improvement comprising:
    an elongation indicator printed on the tape which presents a first, generally distorted appearance when the tape is unstretched and presents a second, generally undistorted appearance when the tape is stretched a certain amount to yield the desired compressive force.

12. A method for protecting a wire, wire splice, or the like, comprising the steps of:
    providing a stretchable, resilient tape having gauge means printed thereon for indicating the amount of stretch of the tape;
    coupling a segment of the tape to the wire;
    stretching another segment of the tape until said gauge means presents a generally undistorted, legible appearance indicating a certain amount of stretch; and
    wrapping the stretched, other segment circumferentially around the wire, the stretched segment applying a compression to the wire.

13. The method according to claim 12, the stretched segment applying a radially-inward compressive force in proportion to said certain amount of stretch.

14. The method according to claim 12, said gauge means including a plurality of longitudinally spaced impressions printed on said tape, said stretching step including longitudinally stretching said other segment until the impressions in the region of the other segment assume a certain visual appearance indicative of said certain amount of stretch.

15. The method according to claim 12, including the step of sequentially coupling the stretched other segment of the tape to the wire and stretching a third segment of the tape longitudinally adjacent to said other segment.

16. The method according to claim 12, including the step of wrapping the tape in spiral relation about the wire with side marginal regions overlapping.

* * * * *

UNITED STATES PATENT AND TRADEMARK OFFICE
CERTIFICATE OF CORRECTION

PATENT NO. : 4,609,579

DATED : September 2, 1986

INVENTOR(S) : Gary G. Hills

It is certified that error appears in the above-identified patent and that said Letters Patent is hereby corrected as shown below:

In Column 5, lines 22 and 23, after the words "stretched a", please delete "desireJ:longitudinal", and insert therefor -- desired longitudinal --.

Signed and Sealed this

Fourth Day of November, 1986

[SEAL]

Attest:

DONALD J. QUIGG

Attesting Officer

Commissioner of Patents and Trademarks

REEXAMINATION CERTIFICATE (3518th)
United States Patent [19]
Hills

[11] B1 4,609,579
[45] Certificate Issued May 26, 1998

[54] METHOD AND APPARATUS FOR APPLYING STRETCHABLE, PROTECTIVE WRAP

[75] Inventor: Gary G. Hills, Austin, Tex.

[73] Assignee: Teltronics, Inc., Austin, Tex.

Reexamination Request:
No. 90/003,492, Jul. 8, 1994

Reexamination Certificate for:
Patent No.: 4,609,579
Issued: Sep. 2, 1986
Appl. No.: 750,890
Filed: Jul. 1, 1985

Certificate of Correction issued Nov. 4, 1986.

[51] Int. Cl.$^6$ ............................ B32B 3/00
[52] U.S. Cl. ............... 428/195; 428/207; 428/36
[58] Field of Search ................. 428/195, 200, 428/207; 73/760, 862.392; 602/75

[56] References Cited

U.S. PATENT DOCUMENTS

| | | | |
|---|---|---|---|
| 2,505,146 | 4/1950 | Ryan | 18/1 |
| 3,203,544 | 8/1965 | Gilbert | |
| 3,567,845 | 3/1971 | Bahder | |
| 3,613,679 | 10/1971 | Bijou | 128/169 |
| 3,789,657 | 2/1974 | Ching, Jr. et al. | |
| 3,879,249 | 4/1975 | Filreis et al. | |
| 3,975,570 | 8/1976 | Ono et al. | |
| 3,983,297 | 9/1976 | Ono et al. | |
| 4,213,463 | 7/1980 | Osenkarski | |
| 4,292,360 | 9/1981 | Riedel et al. | |
| 4,292,851 | 10/1981 | Brewer | |
| 4,297,892 | 11/1981 | Nagy et al. | |
| 4,437,408 | 3/1984 | Arkans | 101/426 |
| 4,457,251 | 7/1984 | Weman et al. | |
| 4,466,843 | 8/1984 | Shimirak | 156/48 |
| 4,599,129 | 7/1986 | Kerwin | |

FOREIGN PATENT DOCUMENTS

| | | | |
|---|---|---|---|
| 2499416 | 8/1982 | France | |
| 2 544 982 | 11/1984 | France | A61F 13/00 |
| 2329371 | 1/1975 | Germany | |
| 49-66965 | 6/1974 | Japan | |
| 49-41503 | 11/1974 | Japan | C09J 7/02 |
| 50-39436 | 11/1975 | Japan | H01B 17/56 |
| 52-40381 | 3/1977 | Japan | G01L 5/06 |
| 53-24362 | 3/1978 | Japan | C09J 7/02 |
| 54-6880 | 3/1979 | Japan | H01B 17/56 |
| 55-129318 | 9/1980 | Japan | H01B 17/56 |
| 58-162507 | 10/1983 | Japan | H01B 7/18 |
| 60-156621 | 10/1985 | Japan | |

OTHER PUBLICATIONS

Raychem XAGA 1600 Brochure.

Teltronics, Inc. v. Southwestern Bell Telephone Company Civil Action No. A–91–CA–728, Admissions.

Teltronics, Inc. v. Minnesota Mining and Manufacturing Co. Deposition of Gary G. Hills.

*Primary Examiner*—William A. Krynski

[57] ABSTRACT

A self-adherent, stretchable, resilient pressure wrapping tape and method of application for compressingly protecting a wire splice or the like, the tape having a gauge incorporated therein for indicating the amount of stretch of the tape. The tape is stretchingly wrapped around the wire splice and has a tensile strength and resilient memory to compressingly engage the wire splice. It is necessary to strecth the tape a certain amount to apply the correct amount of compression; therefore, a gauge is included which indicates the amount of stretch of the tape. The gauge includes a plurality of longitudinally spaced impressions printed on the tape which have a certain visual appearance with the tape unstretched, and another visual appearance when the tape is stretched to the correct amount for the desired compression. For example, the impression may appear as a rectangle with illegible lettering with the tape unstretched, but with the tape stretched correctly the impression appears as a square with legible lettering.

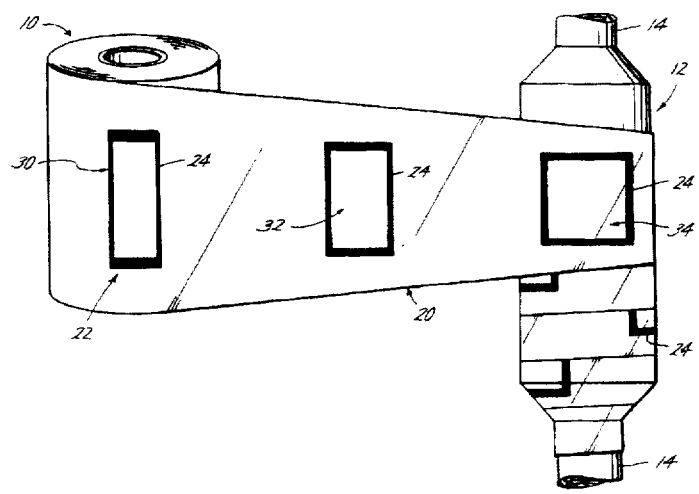

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–16 are cancelled.

* * * * *